(12) United States Patent
Yasutake

(10) Patent No.: US 8,614,664 B2
(45) Date of Patent: Dec. 24, 2013

(54) MULTI-TOUCH MULTI-DIMENSIONAL MOUSE

(75) Inventor: Taizo Yasutake, Cupertino, CA (US)

(73) Assignee: Primax Electronics Ltd., Taipei (TW)

( * ) Notice: Subject to any disclaimer, the term of this patent is extended or adjusted under 35 U.S.C. 154(b) by 595 days.

(21) Appl. No.: 12/914,649

(22) Filed: Oct. 28, 2010

(65) Prior Publication Data

US 2011/0109552 A1      May 12, 2011

Related U.S. Application Data

(60) Provisional application No. 61/280,719, filed on Nov. 9, 2009.

(51) Int. Cl.
*G09G 5/00* (2006.01)
*G06F 3/041* (2006.01)

(52) U.S. Cl.
USPC .......................................... 345/156; 345/173

(58) Field of Classification Search
USPC .................................................. 345/156–179
See application file for complete search history.

(56) References Cited

U.S. PATENT DOCUMENTS

2005/0179650 A1* 8/2005 Ludwig ......................... 345/156
2009/0184936 A1* 7/2009 Algreatly ...................... 345/173

* cited by examiner

*Primary Examiner* — Waseem Moorad
(74) *Attorney, Agent, or Firm* — Kirton McConkie; Evan R. Witt

(57) ABSTRACT

A method for combining at least two touch signals in a computer system is disclosed. The method includes receiving touch signals from two touch pads and creating at least two touch signals having coordinates in the same coordinate system. Then, using these coordinates, a computer system generates a touch command message that is recognizable by a computer application program. Also disclosed is, a computer mouse having two touch pads disposed thereon.

20 Claims, 10 Drawing Sheets

Functional Block Diagram of Multi-touch Mouse (Device Side)

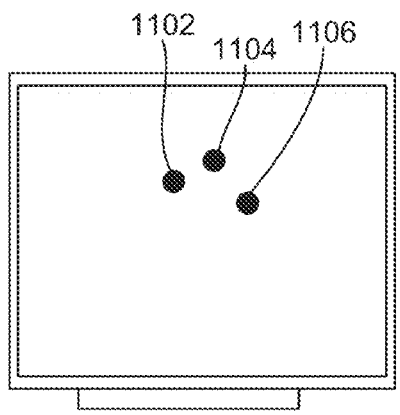
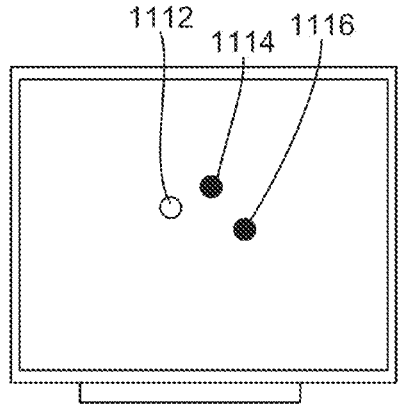
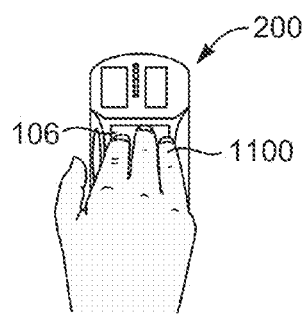
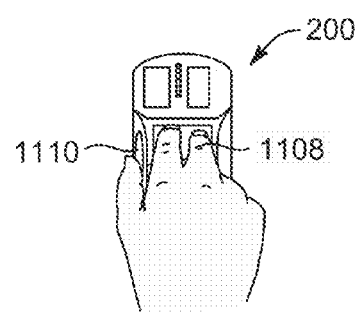
FIG. 11A
FIG. 11B
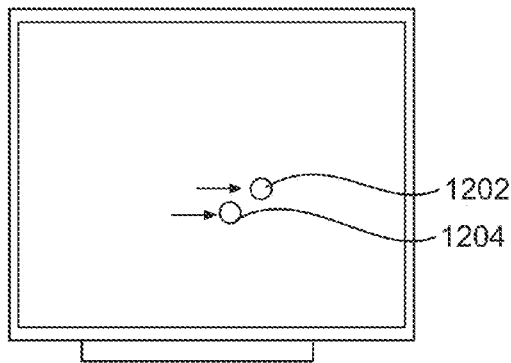
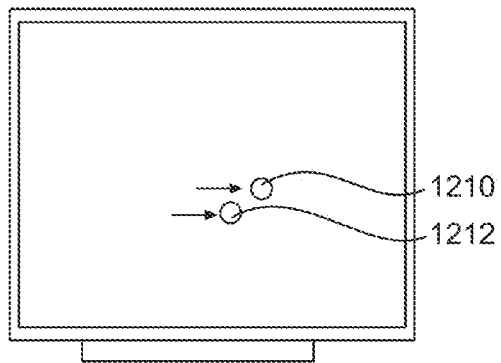
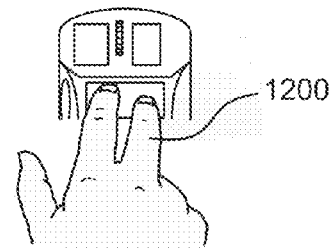
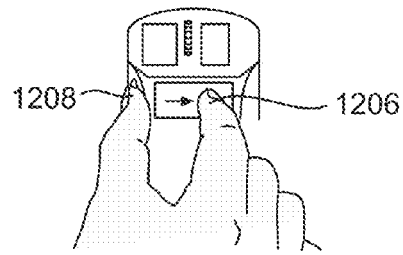
FIG. 12A
FIG. 12B

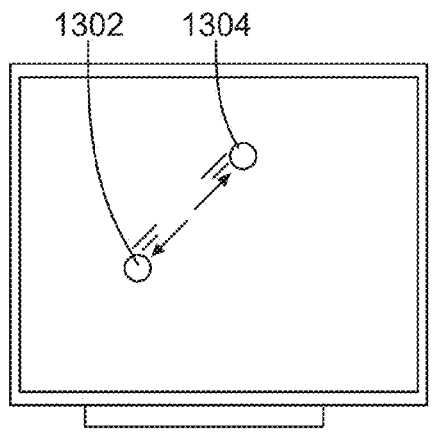
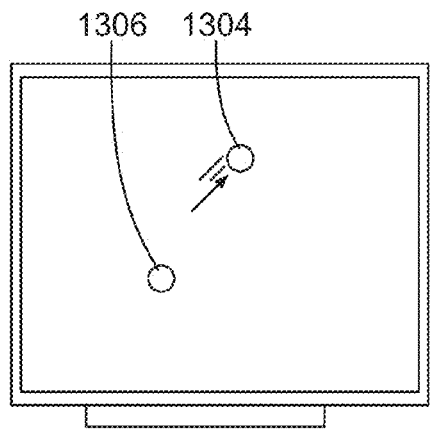
FIG. 13A    FIG. 13B
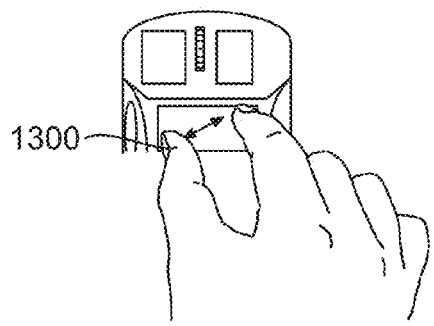
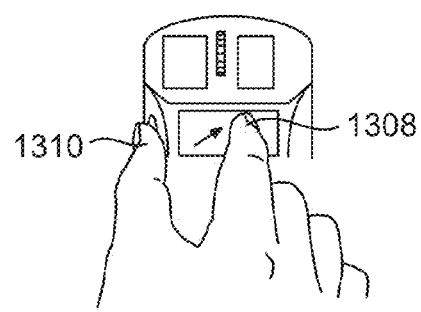
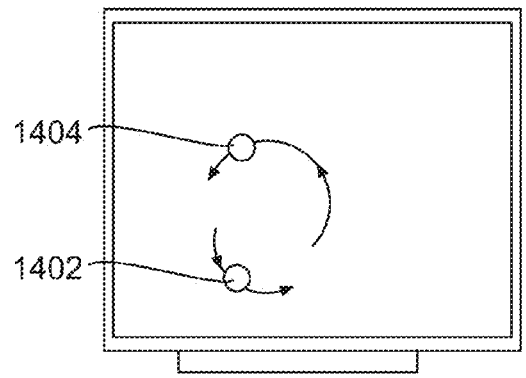
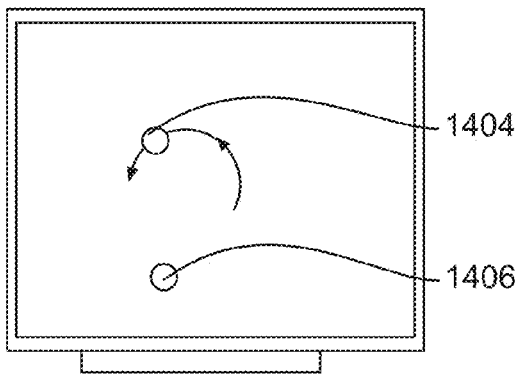
FIG. 14A    FIG. 14B

MULTI-TOUCH MULTI-DIMENSIONAL MOUSE

CROSS-REFERENCE TO RELATED APPLICATION

This application claims the benefit of prior filed Provisional Application No. 61/280,719, filed Nov. 9, 2009, which application is incorporated by reference.

FIELD OF THE INVENTION

The present invention relates to methods for combining at least two touch signals in a computer system. Additionally, the present invention relates to a mouse having at least two touch pads thereon.

BACKGROUND OF THE INVENTION

Recent development of multi-touch sensors provides extended input capabilities including multi-dimensional input commands for computer graphics. The intuitive and user friendly multi-finger gesture-based multi-dimensional input dramatically improves productivity of 2D/3D related works compared with the standard input devices such as a keyboard and/or conventional 2D mouse.

SUMMARY OF THE INVENTION

The new design concept of multi-touch, multi-dimensional navigation and control using multiple touch sensors on a mouse body provides a new way of user interface for conventional 2D applications as well as 3D computer graphics applications.

One non-limiting embodiment of the invention includes a new hardware design of a mouse and interface method to generate multi-touch input commands for any applications which can recognize multi-touch messages defined by the operating system. Another non-limiting embodiment of the invention includes an interface method to utilize multi-touch sensor data packet to the interactive commands for application programs which do not accept multi-touch messages as a standard input.

The interface program for generation of multi-touch input commands includes of a kernel mode device driver and a user application level driver that sends specific messages to the target application program.

The aspects described above will become more readily apparent to those ordinarily skilled in the art after reviewing the following detailed description and accompanying drawings, in which:

BRIEF DESCRIPTION OF THE DRAWINGS

FIG. 11A illustrates a graphical representation of a three finger touch on a single touch pad being mapped to PC screen coordinates.

FIG. 11B illustrates a graphical representation of a three finger touch on two separate touch pads being mapped to PC screen coordinates.

FIG. 12A illustrates a graphical representation of a two finger touch gesture on a single touch pad being mapped to PC screen coordinates.

FIG. 12B illustrates a graphical representation of a two finger touch gesture on two separate touch pads being mapped to PC screen coordinates.

FIG. 13A illustrates a graphical representation of another two finger touch gesture on a single touch pad being mapped to PC screen coordinates.

FIG. 13B illustrates a graphical representation of another two finger touch gesture on two separate touch pads being mapped to PC screen coordinates.

FIG. 14A illustrates a graphical representation of another two finger touch gesture on a single touch pad being mapped to PC screen coordinates.

FIG. 14B illustrates a graphical representation of another two finger touch gesture on two separate touch pads being mapped to PC screen coordinates.

DETAILED DESCRIPTION OF THE PREFERRED EMBODIMENT

Multi-Touch Multi Dimensional Mouse and Control Command Generation

Figure 1:
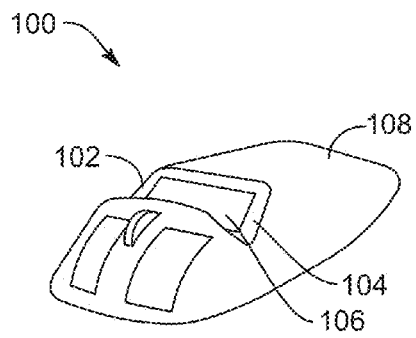
FIG. 1 illustrates a perspective view of a mouse having a touch pad.

FIG. 1 depicts a first embodiment of a multi-touch, multi-dimensional mouse. The mouse (or computer mouse) may be any traditional type of pointing device commonly used in computing, that functions by detecting two-dimensional motion relative to its supporting surface. Physically, in some embodiments, the mouse may comprise an object held under one of the user's hands, with one or more buttons. The mouse may also include a wheel.

In some embodiments, the mouse 100 has a deep V-shaped dent 102 or other indent with a flat surface 104 that is used to house a multi-touch sensor pad 106. Using the multi-touch sensor pad 106 installed on the surface 104 of V-shaped dent 102, the user can send his/her desired multi-touch finger gesture commands with interface drivers. The multi-touch sensor pad 106 is capable of independently detecting multiple finger touches. Such sensor pads are commercially available in the current PC market. Some examples include Elantech smart pad in Taiwan and Touchpad from Synaptics in the US.

The industrial design of a multi-touch, multi-dimensional mouse may vary based on ergonomics. In some embodiments, the mouse has a V-shaped deep dent or indent 102 on the center of mouse body 108. The surface 104 of the dent is flat and has no physical boundaries at the right end and left end. The depth of the dent shall be deep and wide enough to install a small touch pad (about 30 mm×30 mm area or more). The resulting industrial design of the dent on the mouse body allows users to smoothly place multiple fingers and drag them right and left direction or forward and backward direction.

The dent 102 may provide an ergonomically comfortable touch pad usage design and would not cause a user to accidentally activate the touch pad when the user is using the mouse for conventional 2D mouse operation. However, the industrial design of the multi-touch mouse is not limited to the shape of the mouse body and alignment of touch pads.

Figure 2:
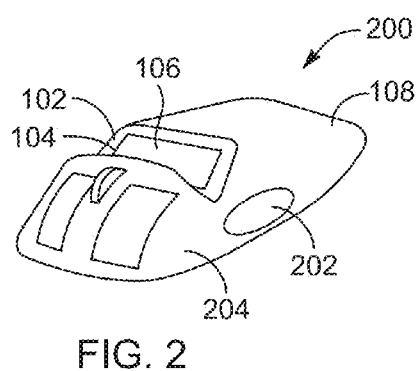
FIG. 2 illustrates a perspective view of a mouse having a multi-touch, multi-dimensional mouse including a two touch pads.

FIG. 2 depicts an embodiment of multi-touch, multi-dimensional mouse 200. The mouse 200 has a deep V-shaped dent 102 that includes a first multi-touch sensor pad 106 and a second sensor pad 202 on the side 204 of mouse body. The second sensor pad 202 can be a multi-touch or single-touch sensing pad.

Figure 6:
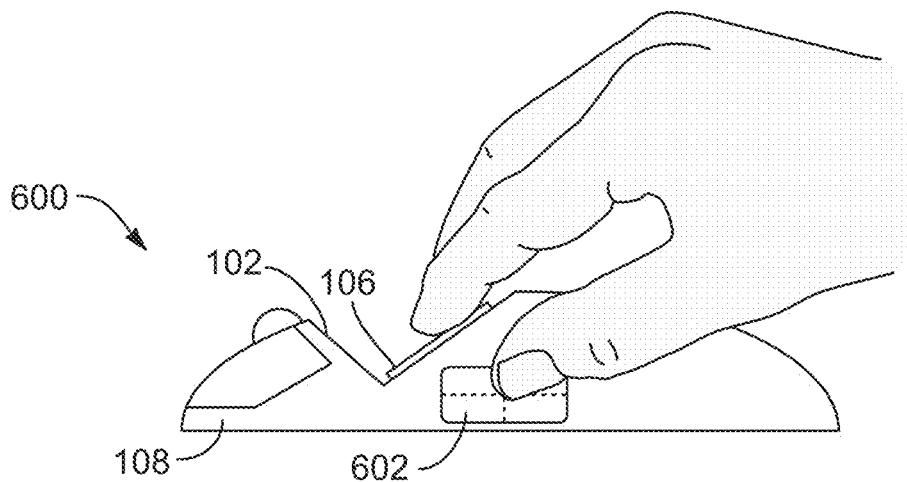
FIG. 6 illustrates a touch pad on a mouse that has four designated portions.
Figure 16:
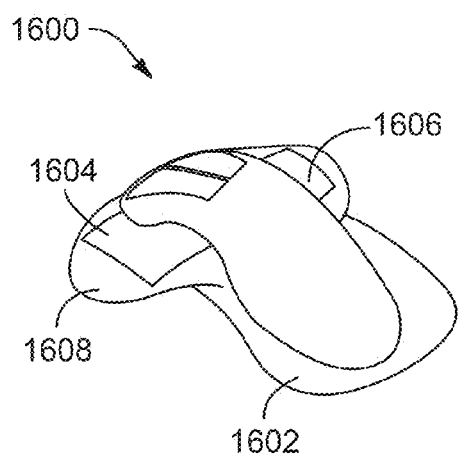
FIG. 16 illustrates another embodiment of a computer mouse having two separate touch pads.
Figure 17:
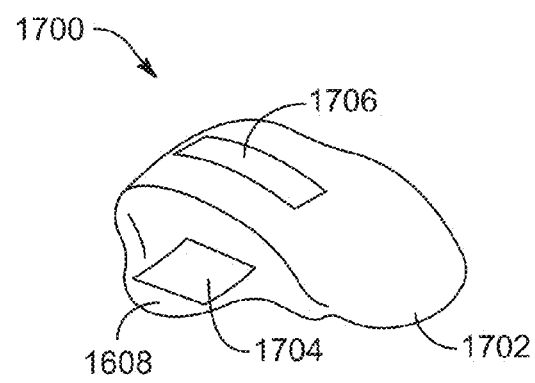
FIG. 17 illustrates yet another embodiment of a computer mouse having two separate touch pads.

FIGS. 6 and 17 depict other embodiments of multi-touch mice 1600 and 1700. FIG. 16 depicts a mouse body 1602 having two side extensions 1608 that each contains a touch pad 1604 and 1606. The touch pads can be either a single-touch or a multi-touch pad. In one embodiment, the multi-touch mouse of FIG. 16 includes two single-touch touch pads. FIG. 17 depicts a mouse body 1702 having two touch pads, a first touch pad 1706 disposed on a top portion of the mouse body 1702 a second touch pad 1704 disposed on a side extension 1608 of the mouse body 1702. Accordingly, the two separate touch pads can be located at various locations on a mouse body.

The multi-touch, multi-dimensional mice depicted in FIGS. 1, 2, 16, and 17 have a conventional 2D mouse capability and can send a multi-touch input data packet to host PC through a USB connection, blue tooth connection, or other such connection. A user touches his/her finger(s) on the surface of main touchpad on V-shaped dent and/or the second sensor pad on the side of mouse body. These finger touch actions are used to generate raw data packets, including data regarding coordinates of the touch points. The data packets are used to generate one of a set of pre-defined touch messages (as known in the art, such as WM_TOUCH or WM_GESTURE in Windows 7 operating system from Microsoft Corp.) in the operating system of the PC. Accordingly, the touch pad 106 generates touch data that includes the coordinates of the each of the touch points on the touch pad. These touch points are used to generate touch command messages that are recognizable by a computer application program.

Using interface software algorithm, in some embodiments, touch points are handled as a sum of touch points on the first sensor pad and the second sensor pad. For example, if the user tries to generate a three finger touch gesture, he/she can use three fingers on the first sensor pad. However, it might be uncomfortable to use three fingers on the first sensor pad while supporting the mouse body by the thumb and little finger. In some embodiments, the interface software combines finger touches of the two finger touches on the first sensor pad and a single touch on the second sensor pad to generate three finger touch messages. Furthermore, in some embodiments, the interface software may combine touches and the mapping of combined finger touches to final multi-touch gesture message can be programmable by interface driver.

Figure 3:
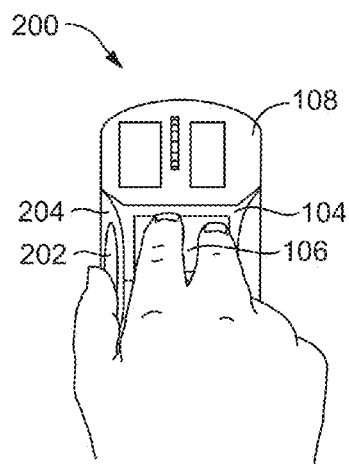
FIG. 3 illustrates a top view of the touch pad of FIG. 2 with a user having two fingers on a top, multi-touch pad and a third finger on a side touch pad.
Figure 4:
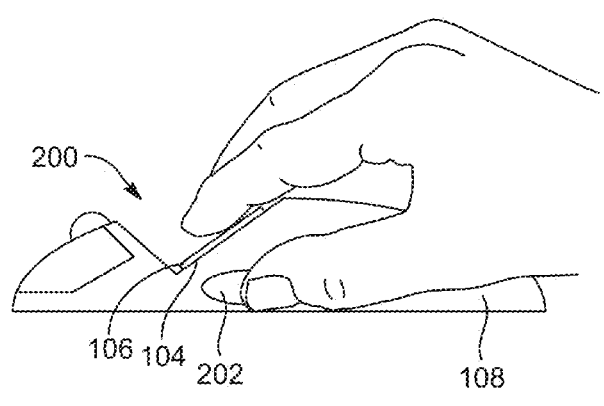
FIG. 4 illustrates a side view of the touch pad of FIG. 3.

FIG. 3 depicts a top view of the multi-touch, multi-dimensional mouse 200 of FIG. 2. FIG. 3 shows combined three finger touch action by using the first sensor pad 106 with two finger touches and the second sensor pad 202 with one finger touch to generate a three finger touch input command. FIG. 4 depicts a side view of the three finger touch action depicted in FIG. 3.

Figure 5:
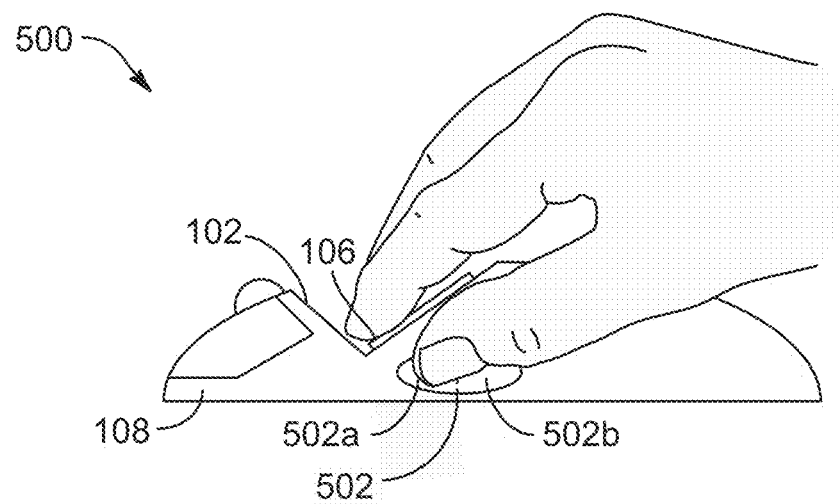
FIG. 5 illustrates a touch pad on a mouse that has two designated portions.

FIG. 5 depicts another usage of the second sensor pad 502 for controlling the number of finger touches according to some embodiments. In this FIG., the second touch pad 502 includes two designated portions, a front and a back portion. The front portion 502a can be touched to generate a one finger touch, while the back portion 502b can be touched to generate a two finger touch. These one and two finger touches are generated using a user programmable interface software. Based on the program settings of the user programmable interface software, a user can generate a four finger touch gesture by a two finger touch and dragging action on the first sensor pad 106 and a one finger touch at backward location 502b of the second sensor pad 502.

FIG. 6 depicts another usage of the second touch pad 602 for controlling the number of finger touches according to some embodiments. As shown, this second touch pad 602 includes four designated portions. In this setting, the number of "finger touches" generated on the second sensor pad 602 touch will be changed depending on four locations (lower forward, upper forward, lower backward, and upper backward locations). For example, in some embodiments touching the lower forward portion of the second touch sensor pad 602 represents one finger touch. Similarly, touching the upper forward portion represents a two finger touch; touching the lower backward portion represents a three finger touch; and touching the upper backward portion represents a four finger touch. Accordingly, in this program setting, the user can generate up to a six finger touch gesture by a two finger touch and dragging action on the first sensor pad 106 and a touch at the upper backward location of the second sensor pad 602.

1. Mapping of Touch Point(s) Data from the Local Coordinates on the Surface of Multi-Touch Pad to Pc Screen Coordinates The touch points on the surface of the touch pads of a mouse can be mapped to PC screen coordinates using at least two mapping methods (or modes). The first method uses absolute coordinate mapping from absolute position data of finger touches on a multi-touch pad to the entire PC screen area. This method is referred to as the entire mapping method. The second mapping method uses absolute coordinate mapping from absolute position data of finger touches on a multi-touch pad to a small portion mapping area on PC screen coordinates, this method is referred to as portion mapping area.

Figure 7:
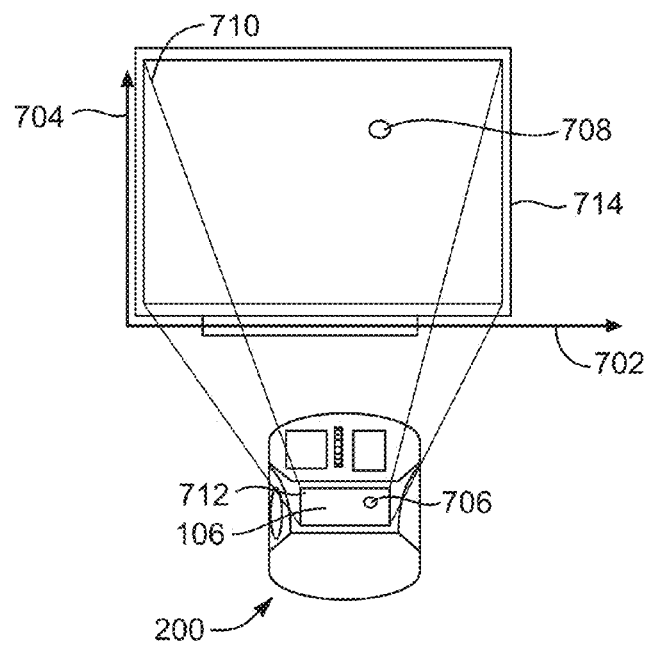
FIG. 7 illustrates a graphic representation of an entire mapping method.

FIG. 7 depicts how the first or entire mapping method works, according to some embodiments. FIG. 7 depicts the entire mapping method in detail. The set of horizontal axis 702 and vertical axis 704 consists of the local two dimensional coordinates on the surface of touch pad 106. The set of horizontal axis 702 and vertical axis 704 consists of the display screen coordinates on the surface of PC screen 714. The absolute position data at upper left corner 710 on touchpad is mapped to the absolute location at upper left corner 712 on the display screen coordinates. Likewise, the absolute position at lower left corner, lower right corner, and upper right corner are mapped to their respective corners on the touchpad 106.

The finger touch 706 on the touch pad 106 reports raw data of local X position and local Y position. This touch data is mapped to the display screen point 708 or the respective X, Y position in screen coordinates. The resolution of touch pad data under entire mapping mode is proportional to the size of touch pad if all other engineering capability and/or specifications of touch pad are not changed. The wider the pad, the higher the input resolution of touch commands on the display screen.

Figures 8A, 8B:
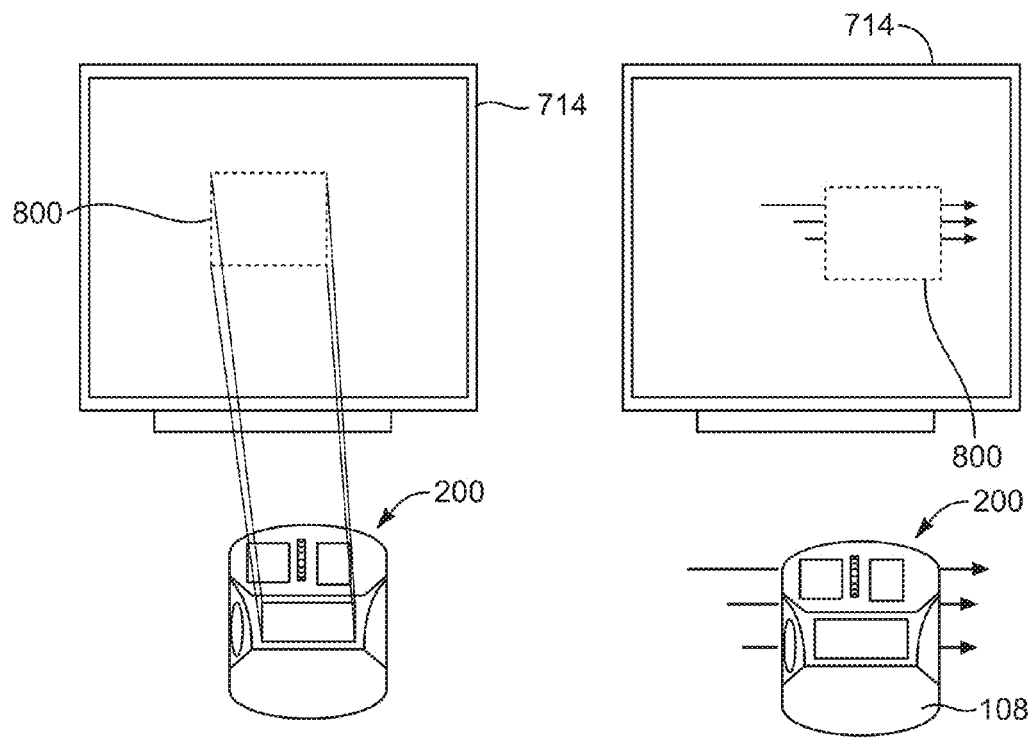
FIG. 8A illustrates a graphic representation of a portion area mapping method.
FIG. 8B illustrates a graphic representation of a portion area mapping method, wherein the portion mapping area is moving.

FIGS. 8A and 8B depict the second mapping method, in which absolute coordinates on the multi-touch pad 106 are mapped to a portion mapping area on PC screen coordinates. As depicted, a user can move the portion mapping area by mouse dragging and then use the touch pad 106 to generate multi-finger touch commands within that portion mapping area.

FIG. 8A depicts the portion mapping method in detail. In this mapping method, the center point specified by the middle points of local X coordinates and local Y coordinates on surface of touch pad 106 is mapped to the center point of pre-defined area 800 on display screen coordinates. As depicted, the pre-defined area 800 only covers a portion of PC screen area. Accordingly, the absolute position data at upper left corner on touchpad is mapped to the absolute location at upper left corner of the portion mapping area 800. Likewise, the absolute position of the lower left corner, lower right corner, and upper right corner of the touch pad 106 are mapped to their respective corners of the portion mapping area 800.

As depicted in FIG. 8B, the user can move the location of the portion mapping area 800 by dragging the mouse body 108. Accordingly, in some embodiments, the host PC interface program uses mouse cursor data to utilize the translation command for the desired location of the mapping area 800. Thus, a user can move his/her mouse cursor to the desired location on PC display screen, then initiate multi-touch commands by touching the surface of multi-touch pad 106 on the mouse. Thus, in some embodiments, the pre-defined portion mapping mode has a technical advantage of realizing higher precision touch data based input control on the display screen compared to the entire mapping mode, because the touch data from touch pad provides higher resolution input on the smaller mapping area.

In some embodiments, regardless of the mapping method, the multi-touch pad 106 defines a USB-HID digitizer by the firmware in the mouse even if its sensor area is much smaller than conventional digitizer. The firmware reports absolute local coordinates data set of each finger touch on the surface of primary touch pad that is defined by USB organization.

Figure 9A:
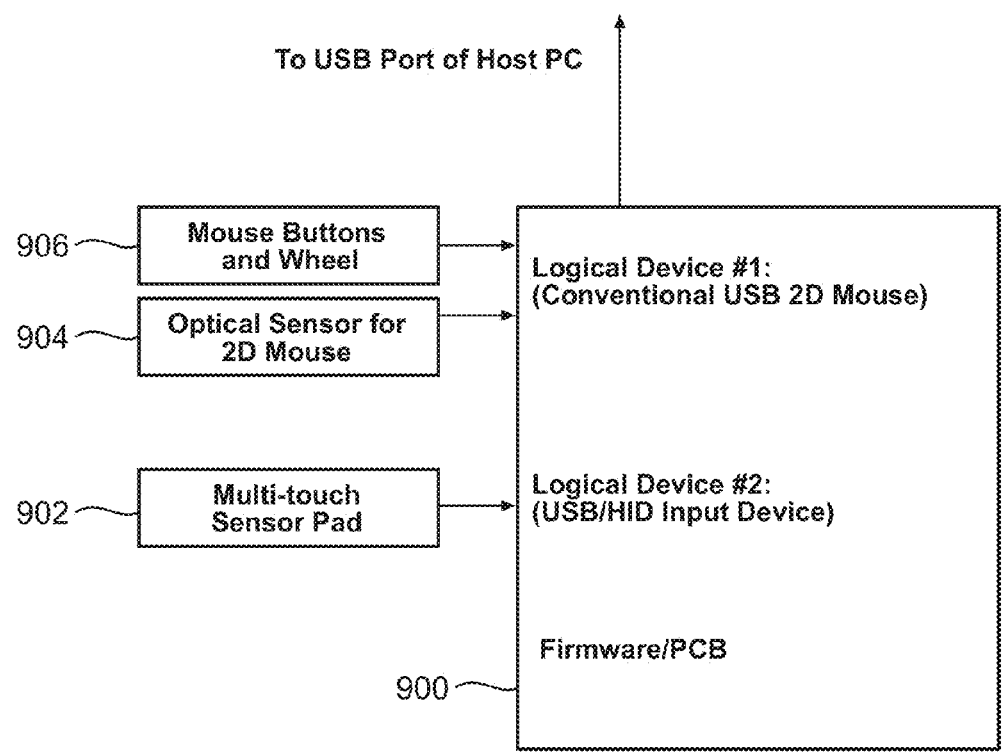
FIG. 9A illustrates a graphical representation of the firmware associated with a mouse having a multi-sensor pad.

2. Multi-Finger Gesture Generation by Multi-Touch Mouse Design with a Multi Touch Pad FIG. 9A depicts the function block diagram of basic hardware components and firmware of a multi-touch, multi-dimensional mouse. In some embodiments, firmware 900 logically defines two independent USB devices or logical device #1 and logical device #2. The logical device #1 acquires mouse sensor data 904 and 906 and sends conventional 2D mouse data packets to a host PC through a USB connection. The logical device #2 acquires data from the touch sensor pads 902 and sends that data packet as a USB-HID input device defined by USB organization.

Once the multi-touch pad is defined as a digitizer by the firmware on the mouse, the touch signals are received by a kernel driver of the PC operating system, such as a Windows 7 operating system, and converted to touch messages, such as WM_TOUCH in Windows. When the mouse is moved the mouse sends mouse input data to the firmware, software, or hardware (based on the mouse input configuration), which identifies a changes in the coordinates of the mouse based on the movement of the mouse. In response to this mouse input data, the portion mapping area is moved in the direction of the mouse movement. FIG. 9A depicts a functional block diagram of firmware in multi-touch mouse. The firmware acquires the data packets of local absolute coordinates of touch points on the multi-touch pad in a real time manner. Then, those coordinates are mapped onto the PC screen coordinates by the firmware. The output data packet from the firmware contains the number of finger touch and X-Y position data of each touch data in PC screen coordinates.

3. Multi-Finger Gesture Generation by the Multi-Touch Mouse Design with a Primary Multi Touch Pad and a Digital Switch (On-Off Signal Based Sensor) or a Secondary Touch Pad (Touch/Non-Touch Status Only)

Figure 9B:
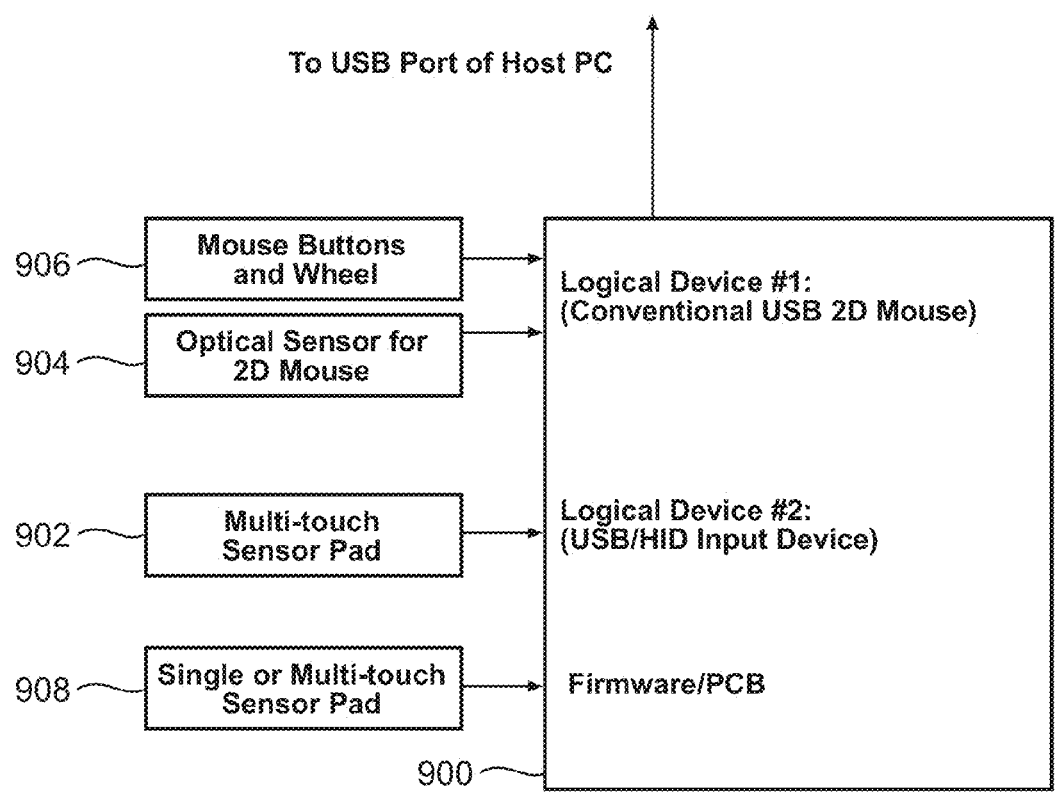
FIG. 9B illustrates a graphical representation of the firmware associated with a mouse having a multi-sensor touch pad and a second touchpad.

FIG. 9B depicts the function block diagram of basic hardware components and firmware of a multi-touch, multi-dimensional mouse containing a primary multi-touch sensor 902 and the secondary touch pad 908 (single touch detection only or multi-touch). In some embodiments, the firmware 900 logically defines two independent USB devices or logical device #1 and logical device #2.

Figure 10A:
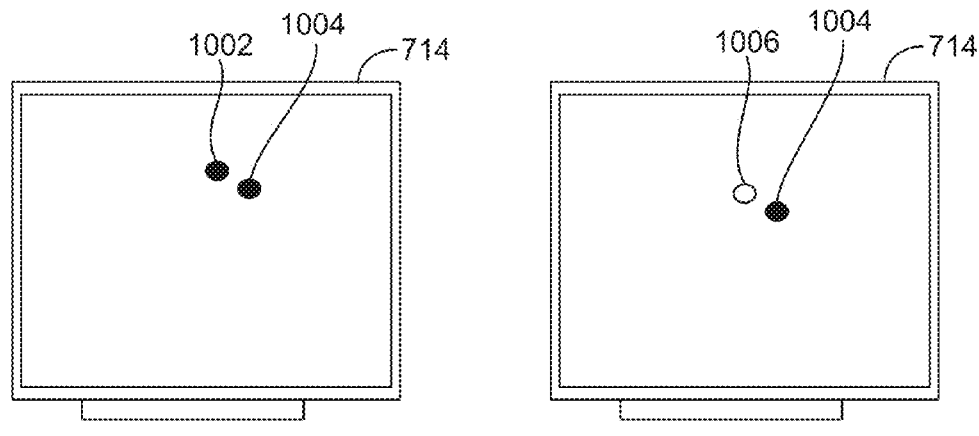
FIG. 10A illustrates a graphical representation of a two finger touch on a single touch pad being mapped to PC screen coordinates.
Figure 10A:
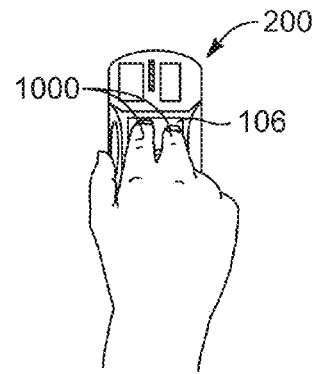
Figure 10B:
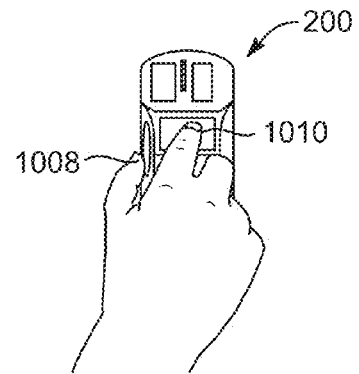
FIG. 10B illustrates a graphical representation of a two finger touch on two separate touch pads being mapped to PC screen coordinates.

FIGS. 10A and 10B depict two finger touch mapping by different touch data sets. In FIG. 10A, a user places two fingers 1000 on a primary pad 106, then this touch data is mapped onto PC screen as two touch points 1002 and 1004. In FIG. 10B, the touch data from a first finger 1010 on a primary pad is mapped on to the PC screen 714 as a first touch point 1004 and touch status data (touch or non-touch) from thumb 1008 touching a secondary pad is used to create virtual touch point 1006 as a second touch point on PC screen. The distance between the first touch point 1004 and second touch point (virtual touch point) 1006 can be programmable by firmware. The firmware computes the absolute local coordinates data for the second touch point using the absolute local coordinate data of the first touch point on the primary pad with computation of predefined small X, Y data addition or subtraction. Once the virtual touch point 1006 is computed, the coordinates of this and other touch points are included in a data packet that is sent to the host PC. The host PC uses these touch points to generate a touch command message that is recognized by a computer application program.

FIGS. 11A and 11B depict three finger touch mapping by different touch data sets. In FIG. 11A, a user places three fingers 1100 on a primary pad 106, then the touch data from the three finger touches is mapped onto the PC screen as points 1102, 1004, and 1006.

In FIG. 11B, the two touch point data from two fingers 1108 on a primary pad is mapped onto a PC screen as two touch points 1114 and 1116 and touch status data (touch or non-touch) from the user's thumb touching a secondary pad 1110 is used to create virtual touch point 1112 as a third touch point on the PC screen. The distance between the two real touch points and the third touch point (a virtual touch point) can be programmable by firmware. The firmware computes the absolute local coordinates data for the third touch point using the absolute local coordinates data of the first and second touch points on the primary pad with computation of predefined small X, Y data addition or subtraction.

FIG. 12A and FIG. 12B depict a translation gesture generation by a two finger touch. In FIG. 12A, a user can drag two fingers 1200 in a horizontal or vertical direction on the primary touch pad (multi-touch detectable sensor) to generate two finger based translation gesture (two "real touch" action), illustrated as 1202 and 1204. In FIG. 12B, a user can drag one finger 1206 in a horizontal or vertical direction on the primary touch pad (multi-touch detectable sensor) with simultaneous touching a secondary pad with thumb 1208 to generate a two finger based translation gesture, represented by 1210 and 1212. Notice that this two finger based translation gesture consists of a real touch point from the primary touch pad and a virtual, second touch point (virtual touch point) from secondary pad. If the primary finger trajectory of the primary touch point over time is in a horizontal or vertical direction, then the firmware recognizes this gesture as a translating gesture and computes the virtual touch point in coordinates that follow the primary touch point, as shown. Using the data associated with these touch points, the host PC recognizes that over time, the first touch point has a horizontal or vertical trajectory and generates a translating gesture touch command message that is recognizable by a computer application program.

FIGS. 13A and 13B depict the stretch/pinch gesture generation by a two finger touch. In FIG. 13A, a user can stretch or pinch two fingers 1300 on the primary touch pad (multi-touch detectable sensor) to generate a two finger based stretch/pinch gesture, represented by 1302 and 1304. In FIG. 13B, a user can drag one finger 1308 in a diagonal direction on the primary touch pad (multi-touch detectable sensor) with simultaneous touching on the secondary pad with another finger or thumb 1310 to generate a two finger based stretch/pinch gesture, represented by 1304 and 1306. If the primary finger trajectory is in a diagonal direction, then the firmware computes the coordinates of the virtual touch point 1306 as a static, pivot point. Accordingly, the host PC generates a pinch or stretch gesture touch command message.

FIG. 14A and FIG. 14B depict a rotation gesture generation by two finger touch. In FIG. 14A, the user can drag two fingers 1400 on the primary touch pad (multi-touch detectable sensor) to generate a two finger based circular gesture, represented by 1402 and 1404. In FIG. 14B, the user can drag one finger 1408 to make circular trajectory on the primary touch pad (multi-touch detectable sensor) with simultaneous touching on the secondary pad with another finger or thumb 1410 to generate a two finger based circular gesture, represented by 1404 and 1406. When the primary finger trajectory is recognized as a circular trajectory by the firmware, then the firmware computes the coordinates of the virtual touch point 1406 as a static, pivot point. Accordingly, the host PC generates a rotation gesture touch command message.

4. Multi-Finger Gesture Generation by the Multi-Touch Mouse Design with a Single Touch Sensor Pad and a Digital Switch or a Secondary Touch Pad (Touch/Non-Touch Status Only)

The multi-touch gesture generation can be created by the installation of a single-touch touch pad and a digital switch (or touch status detection sensor pad). In some embodiments, such as that depicted in FIG. 16, the multi-touch mouse consists of two single touch detection sensors. This embodiment can be defined as reduced gesture function based multi-touch mouse realization.

Referring again to FIG. 9B, which depicts a function block diagram of basic hardware components and firmware of multi-touch, multi-dimensional mouse containing two single touch detection sensors. In some embodiments, the firmware 900 logically defines two independent USB devices or logical device #1 and logical device #2. In these embodiments, the mouse installs a touch pad 908 that can detect single touch only with a digital switch that can detect only touch (ON) or release (OFF). The hardware for this switch can be a push in/out switch or a touch sensor that detects touch/non-touch status.

This embodiment can generate up to two finger gesture commands. FIG. 12B depicts that a data set containing a finger touch on a primary pad (detection of single touch position only) and secondary pad (touch/non-touch status only) can be mapped on PC screen. The secondary touch data (touch On/Off status) is used as a virtual touch point that is described in the above section 3 entitled "Multi-Finger Gesture Generation by the Multi-Touch Mouse design with Multi Touch pad and digital switch (ON-Off signal based sensor)."

The two finger based translation gesture is similar to the finger gesture generation case depicted in FIG. 12B. The two finger based pinch/stretch gesture generation is similar to the finger gesture generation case depicted in FIG. 13A and FIG. 13B. The two finger based rotation gesture generation is similar to the finger gesture generation case depicted in FIG. 14B.

5. Device Driver Program on Host PC

Figure 15:
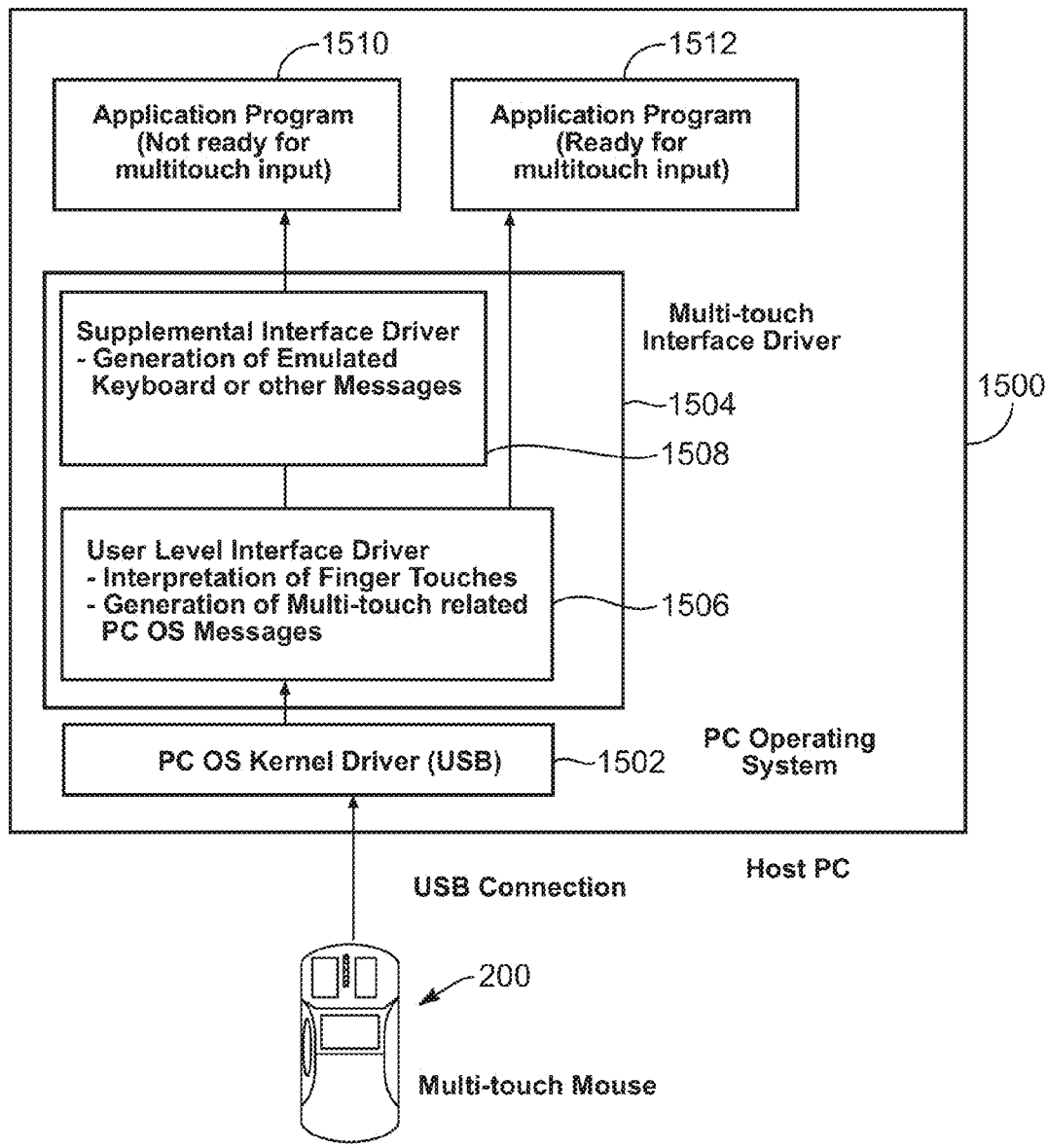
FIG. 15 illustrates a block diagram of hardware and software components connected to the multi-touch mouse.

FIG. 15 depicts the function block diagram of device drivers to manage data packets of multi-touch, multi-dimensional mouse and command generation of multi-dimensional control for application program. The device driver module in a kernel mode layer in the operating system will acquire raw data of both logical device #1 and logical device #2 defined by the firmware of the mouse. In some embodiments, the connection between the input device (e.g. the mouse) and the computer is a USB connection. In other embodiments, other connection types are used, such as wireless Bluetooth, etc. The operating system in computer such as the Windows operating system provides a built-in kernel mode driver for acquisition of USB data packets. The device driver module in a user mode layer in the operating system acquires raw data packets of the mouse and executes the following two computational steps: (1) interpretation of data packets from USB driver, and (2) generation of multi-touch, multi-dimensional commands.

In the first step, by using a software method, the user level device driver identifies the number of finger touch points, local position on each finger for each sensor pad in a real-time manner. In the second step, if the application is ready to accept multi-touch messages as one of a standard interactive input stream, then the interface driver will send the pre-defined multi-touch messages (i.e. WM_TOUCH or WM_GESTURE in Windows 7 operating system) depending on the combined number of finger touches and finger tip trajectories.

If the application program is available and does not recognize multi-touch messages as its standard interactive input commands, then the user level device driver will activate a supplemental interface driver. The supplemental interface driver will send the application program the modified sensor pad data that are converted to the application specific input formats which are recognizable to the application program.

For example, if the application program can only recognize the conventional standard input data defined in the operating system, such as a mouse/keyboard in case of old Windows operating systems, then the supplemental device driver will convert data packets of the multi-touch sensor pad to a set of conventional standard input format and send the application program emulated input messages of conventional standard input so that the application program can execute its interactive commands.

While the invention has been described in terms of some particular embodiments, it is to be understood that the invention needs not be limited to the disclosed embodiment. On the contrary, it is intended to cover various modifications and similar arrangements included within the spirit and scope of the appended claims.

What is claimed is:

1. A method for combining at least two touch signals in a computer system, the method comprising:
   receiving a first touch signal from a first touch pad, the first touch signal indicating that a user has touched the first touch pad at a first touch point with a first digit, the first touch signal identifying the absolute coordinates of the first touch point;
   receiving a second touch signal from a second touch pad, the second touch signal indicating that the user was touching the second touch pad with a second digit while the user touched the first touch pad at the first touch point;
   based on the second touch pad being touched while the first touch pad was touched at the first touch point, calculating absolute coordinates for a second touch point on the first touch pad, the absolute coordinates for the second touch point being offset from the absolute coordinates of the first touch point;
   generating a touch command message that is recognizable by a computer application program, the touch command message defining the absolute coordinates of the first touch point and the absolute coordinates of the second touch point.

2. The method of claim 1, wherein the absolute coordinates for the second touch point are offset from the absolute coordinates of the first touch point by a distance.

3. The method of claim 1, further comprising mapping the first and second touch points to a PC screen.

4. The method of claim 1, further comprising mapping the absolute coordinates of the first touch pad to a portion mapping area of coordinates of the PC screen, the portion mapping area being less than the entire PC screen area.

5. The method of claim 4, further comprising receiving mouse input data from a mouse, the mouse input data identifying a change of coordinates of the mouse, and moving the coordinates of the portion mapping area on the PC screen in response to the mouse input data.

6. The method of claim 1, wherein the first touch pad is a multi-touch pad and the method further comprising:
   receiving a third touch signal from the multi-touch pad, the third touch signal identifying the absolute coordinates of a third touch point on the first touch pad; and
   wherein the touch command message also defines the absolute coordinates of the third touch point.

7. The method of claim 1, wherein the second touch pad includes a plurality of designated portions, and wherein the second touch signal indicates which designated portion is touched.

8. The method of claim 7, wherein the method further comprises, in response to the receipt of the second touch signal that indicates that a first designated portion is touched, calculating absolute coordinates for a third touch point on the first touch pad, the absolute coordinates for the third touch point being offset from the absolute coordinates of the first touch point.

9. The method of claim 7, wherein at least one of the designated portions of the second touch pad represents a multiple finger touch.

10. The method of claim 9, wherein the multiple finger touch represents two touches, three touches, or four touches, wherein the method further comprises using the second touch signal to compute a third, a fourth, a fifth, or a sixth touch point, each having absolute coordinates offset from the first touch point.

11. The method of claim 1, further comprising recognizing the direction of the movement of a first touch point over time, and in response thereto, computing both the location and direction, over time, of the first touch point.

12. The method of claim 1, further comprising, recognizing the trajectory of the first touch point over time, and generating a translating gesture touch command message when the first touch point is recognized as having at least one of a horizontal and a vertical trajectory.

13. The method of claim 1, further comprising, recognizing the trajectory of the first touch point over time, and generating at least one of a pinch and stretch gesture touch command message when the first touch point is recognized as having a diagonal trajectory.

14. The method of claim 1, further comprising, recognizing the trajectory of the first touch point over time, and generating a rotation gesture touch command message when the first touch point is recognized as having a circle trajectory.

15. The method of claim 1, further comprising providing the first and second touch pads on a computer mouse.

16. A computer mouse comprising:
   a mouse body;
   a first touch pad disposed on the mouse body, the first touch pad configured to generate a first touch signal that defines absolute coordinates of a first touch point on the first touch pad;
   a second touch pad disposed on the mouse body, the second touch pad configured to generate a second touch signal representing whether the second touch pad is being touched; and
   logic for implementing the following:
      receiving the first touch signal from the first touch pad and the second touch signal from the second touch pad;
      determining that the second touch signal from the second touch pad indicates that the second touch pad was touched while the first touch pad was touched at the first touch point;
      based on the second touch pad being touched while the first touch pad was touched at the first touch point, computing a second touch point on the first touch pad, the second touch point being assigned absolute coordinates that are offset from the absolute coordinates of the first touch point; and
      generating a touch command message that is recognizable by a computer application program, the touch command message defining the absolute coordinates of the first and second touch points.

17. The computer mouse of claim 16, further comprising an indent on a top surface of the mouse body, and wherein the first touch pad is disposed within the indent.

18. The computer mouse of claim 16, wherein the second touch pad is disposed on a side surface of the mouse body.

19. The computer mouse of claim 16, wherein the first touch pad is a multi-touch touch pad and wherein the second touch pad is a single-touch touch pad.

20. The computer mouse of claim 16, wherein the second touch pad includes two or more designated portions, each of the designated portions being configured to indicate when that designated portion is touched.

* * * * *